(12) United States Patent
Welsch et al.

(10) Patent No.: US 12,113,855 B2
(45) Date of Patent: Oct. 8, 2024

(54) NODE CLUSTERING CONFIGURATION

(71) Applicant: Elasticsearch B.V., Mountain View, CA (US)

(72) Inventors: Yannick Welsch, Junglinster (LU); David Christopher Turner, Otley (GB)

(73) Assignee: ELASTICSEARCH B.V., Amsterdam (NL)

( * ) Notice: Subject to any disclaimer, the term of this patent is extended or adjusted under 35 U.S.C. 154(b) by 7 days.

(21) Appl. No.: 17/373,547

(22) Filed: Jul. 12, 2021

(65) Prior Publication Data
US 2021/0344750 A1   Nov. 4, 2021

Related U.S. Application Data

(63) Continuation of application No. 16/670,763, filed on Oct. 31, 2019, now Pat. No. 11,122,118.

(51) Int. Cl.
| | |
|---|---|
| *H04L 67/104* | (2022.01) |
| *H04L 41/0668* | (2022.01) |
| *H04L 41/0853* | (2022.01) |
| *H04L 41/0893* | (2022.01) |
| *H04L 41/12* | (2022.01) |
| *H04L 67/1061* | (2022.01) |
| *H04L 69/40* | (2022.01) |

(52) U.S. Cl.
CPC ...... *H04L 67/1051* (2013.01); *H04L 41/0668* (2013.01); *H04L 41/0853* (2013.01); *H04L 41/0893* (2013.01); *H04L 41/12* (2013.01); *H04L 67/1046* (2013.01); *H04L 67/1068* (2013.01); *H04L 69/40* (2013.01)

(58) Field of Classification Search
CPC ............. H04L 67/1051; H04L 41/0668; H04L 41/0853; H04L 41/0893; H04L 41/12; H04L 67/1046; H04L 67/1068; H04L 69/40
See application file for complete search history.

(56) References Cited

U.S. PATENT DOCUMENTS

| | | | |
|---|---|---|---|
| 6,192,401 B1 * | 2/2001 | Modiri | G06F 9/5061 370/254 |
| 9,805,108 B2 | 10/2017 | Merriman et al. | |
| 11,122,118 B2 | 9/2021 | Welsch et al. | |
| 2013/0290249 A1 * | 10/2013 | Merriman | G06F 16/278 707/610 |
| 2014/0207925 A1 * | 7/2014 | Xun | H04L 41/0893 709/223 |
| 2017/0116095 A1 * | 4/2017 | Schatz | G06F 11/1425 |
| 2017/0264493 A1 | 9/2017 | Cencini et al. | |

(Continued)

*Primary Examiner* — Kristie D Shingles
(74) *Attorney, Agent, or Firm* — Quinn IP Law

(57) ABSTRACT

Node clustering configuration is disclosed herein. An example method includes determining nodes of a cluster, each of the nodes having a unique identifier and a cluster identifier for the cluster, determining a voting configuration for the cluster, the voting configuration defining a quorum of master-eligible nodes of the nodes, the voting configuration being adaptable so as to maintain an optimal level of fault tolerance for the cluster, adding and removing nodes that can change the voting configuration, configuring a cluster configuration through an API, and electing one of the master-eligible nodes as a master node.

17 Claims, 4 Drawing Sheets

(56) References Cited

U.S. PATENT DOCUMENTS

| | | | |
|---|---|---|---|
| 2018/0032575 A1* | 2/2018 | Pryce | G06F 16/2455 |
| 2018/0074924 A1* | 3/2018 | Schatz | G06F 11/1425 |
| 2019/0058762 A1* | 2/2019 | Gururaj | G06F 9/4856 |
| 2019/0173739 A1 | 6/2019 | Cui et al. | |
| 2020/0028901 A1* | 1/2020 | Suresh | H04L 41/12 |
| 2021/0136146 A1 | 5/2021 | Welsch et al. | |

* cited by examiner

NODE CLUSTERING CONFIGURATION

CROSS REFERENCE TO RELATED APPLICATIONS

The present application is a continuation of U.S. patent application Ser. No. 16/670,763, filed Oct. 31, 2019, entitled "Node Clustering Configuration." The disclosure of the above-referenced application is hereby incorporated by reference herein in its entirety for all purposes.

FIELD

The present technology pertains to cluster coordination, and in some embodiments, to systems and methods that create clusters of nodes and maintain an optimal level of fault tolerance for the cluster.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes determining nodes of a cluster, each of the nodes having a unique identifier and a cluster identifier for the cluster; determining a voting configuration for the cluster, the voting configuration defining a quorum of master-eligible nodes of the nodes, the voting configuration being adaptable so as to maintain an optimal level of fault tolerance for the cluster; and electing one of the master-eligible nodes as a master node.

Another general aspect includes a method comprising bootstrapping a cluster by determining master-eligible nodes; and allowing the master-eligible nodes to perform an automatic discovery process to create a cluster, each of the master-eligible nodes having a unique identifier and a cluster identifier. Establishing an optimal level of fault tolerance for the cluster using a voting configuration and reconfiguring the voting configuration based on a change to the cluster.

According to some embodiments, the present disclosure is directed to an example system comprising a cloud service having processors and memory for storing instructions, the processors being configured to execute the instructions to determine nodes in a cluster, each of the nodes having a unique identifier and a cluster identifier for the cluster; determine a voting configuration for the cluster, the voting configuration defining a quorum of master-eligible nodes of the nodes; and elect one of the nodes as a master node based on the voting configuration. The example system can also be implemented in an on premises solution using a network of computer systems or even a single computer system or server.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally speaking, the present disclosure is directed to node clustering systems and methods. These methods and systems can be utilized in various distributed processing systems.

For example, systems like Elasticsearch™ involve multiple processes which all run independently, typically distributed across separate computers, but which communicate with each other over a network to cooperate and act as a single system. Each process is known as a node. Distributed systems like this are useful because they have access to the sum of the computing power of all the individual host computers. However, they are tricky to implement because these systems can experience partial failures. For example, some of the nodes may unexpectedly shut down or may be temporarily unable to communicate with some of the other nodes. Failures are impossible to predict or even to reliably detect. It is conceivable that the mechanism used to detect failure is the component that has failed. The system as a whole should continue to work correctly despite such failures.

Distributed systems perform some amount of system-wide decision making, also known as coordination. For instance, Elasticsearch™ makes system-wide decisions about which nodes should hold a copy of a document. These coordinated decisions must be consistent across the cluster because an inconsistency might lead to the system not working correctly. For instance, inconsistency might cause a document to be lost.

One approach for coordination is to declare one node to be the master of the cluster, giving that node the authority to make all coordinated decisions on behalf of the cluster. Recall, however, that it is reasonable to expect nodes to fail occasionally, and this includes the master node. Compensating for the failure of a master node can be accomplished by selecting a different node to become the master node in its place.

It will also be understood that some nodes in a cluster may not always be able to communicate with each other reliably. The systems and methods disclosed herein are capable of allowing for cluster coordination, even when node-to-node communication is disrupted, including situations where a cluster is divided into two or more disconnected pieces. The systems and methods can be configured to prevent a situation where both parts of the cluster have selected one of their members as a master, which would result in inconsistent decisions and therefore incorrect behavior.

In general, the present disclosure presents systems and methods for bootstrapping and auto-reconfiguring a cluster of nodes. Additionally, these clusters of nodes, such as an Elasticsearch™ cluster, can make coordinated decisions correctly and reliably despite the fact that its nodes might have failed or might be disconnected from each other. These and other aspects of the present disclosure are provided in greater detail below with reference to the collective drawings.

Figure 1:
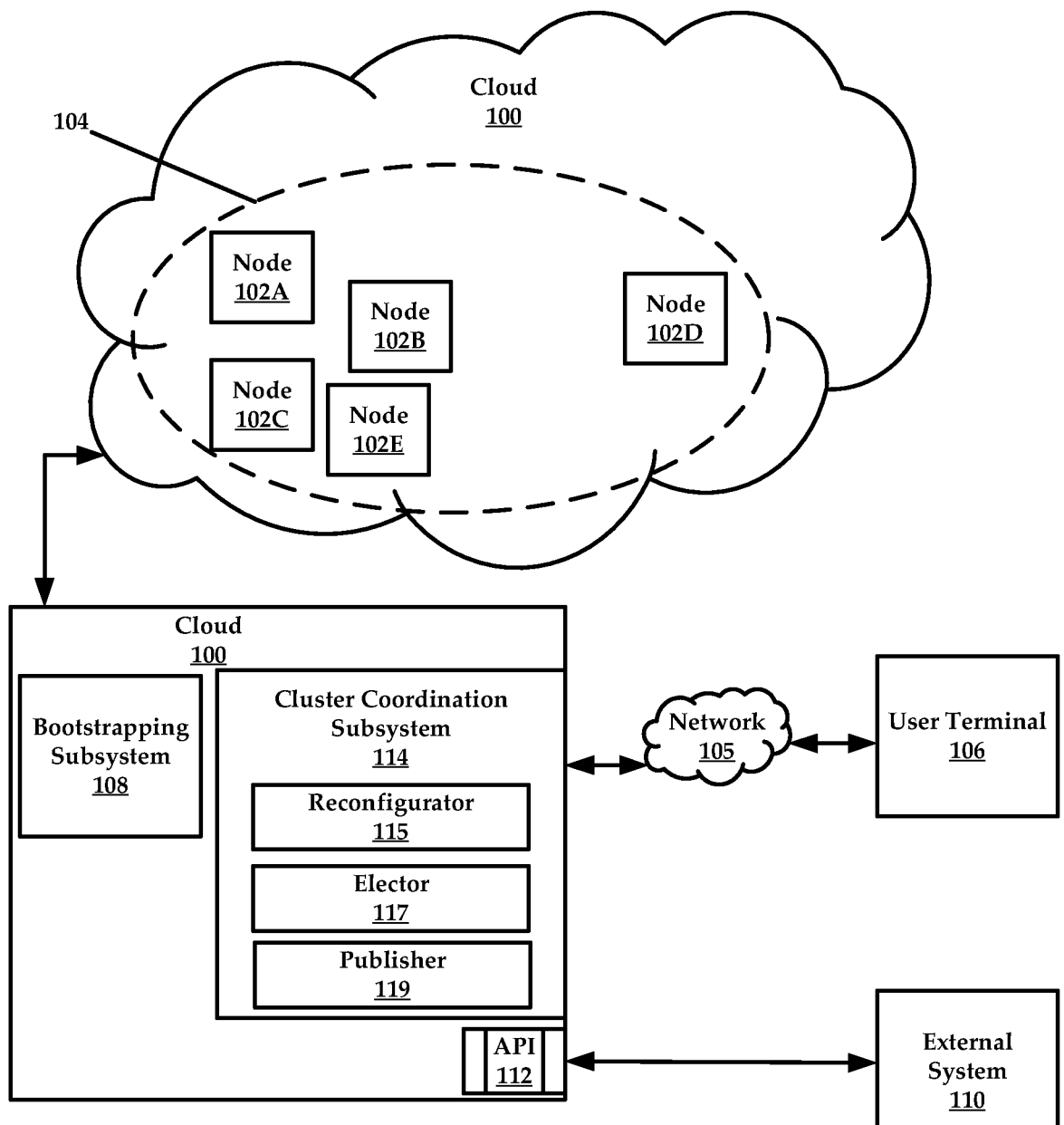
FIG. 1 is a schematic diagram of an example environment where aspects of the present disclosure can be practiced.

FIG. 1 is a schematic diagram of an example environment where aspects of the present disclosure can be practiced. The environment includes a distributed computing environment such as a cloud 100. The cloud 100 can host many nodes, such as nodes 102A-102E that can create a cluster 104. A user terminal 106 can access the cluster 104 to use various services, such as Elasticsearch™ services. The user terminal 106 can communicatively couple with the cloud 100 over any public or private network 105.

In some embodiments, the cluster 104 can perform many tasks that require a number of nodes to work together, such as nodes 102A-102E. For example, a search can be routed to all the right shards to ensure that its results are accurate.

A client request, such as a search request, can be forwarded from the node that receives it to the nodes that can handle it. The nodes each have an overview of the cluster so that they can perform searches, indexing, and other coordinated activities. This overview is known as the cluster state. The cluster state determines attributes such as mappings and settings for each index, shards that are allocated to each node, and the shard copies that are in-sync. This information ideally is kept consistent across the cluster 104.

In general, a node can have a role as a master-eligible node, a voting-only, master-eligible node, as well as non-master-eligible nodes such as data nodes, ingest nodes, coordinating nodes, and machine learning nodes. For example, nodes 102A-102C are master-eligible nodes in the cluster 104. It is also possible that each of the nodes 102A-102E are master-eligible nodes, but each can also assume other roles, in some embodiments. In other embodiments, the cluster can comprise additional non-master-eligible nodes. While fewer or more master-eligible nodes can be present, the cloud 100 can apply rules to ignore certain master-eligible nodes when an even number of nodes are present, as will be discussed below.

These various node roles can include a data node that can hold data shards that contain documents that have been indexed by a user. An ingest node can execute pre-processing pipelines, composed of one or more ingest processors. A coordinating node can route requests, handle a search reduce phase, and distribute bulk indexing. Coordinating only nodes behave as smart load balancers. Machine learning nodes can be configured to perform any desired machine learning function, as defined by a user. To be sure, the role of a node can be changed by a user as-needed. In some embodiments, data nodes and master-eligible nodes can be provided access to a data directory where shards and index and cluster metadata can be stored.

In general, a master-eligible node is a node that is responsible for lightweight cluster-wide actions such as creating or deleting an index, tracking which nodes are part of the cluster, and deciding which shards to allocate to which nodes. Any master-eligible node that is not a voting-only master-eligible node may be elected to become the master node by the master election process. A voting-only master-eligible node is a node that participates in master elections but which may not act as a cluster's elected master node. In particular, a voting-only node can serve as a tiebreaker in elections.

An election process can be used to agree on an elected master node, both at startup and if the existing elected master fails. Any master-eligible node can start an election, and normally the first election that takes place will succeed. Elections only usually fail when two nodes both happen to start their elections at about the same time, so elections are scheduled randomly on each node to reduce the probability of this happening. Nodes will retry elections until a master is elected, backing off on failure, so that eventually an election will succeed (with arbitrarily high probability). The scheduling of master elections are controlled by the master election settings. These schedules can specify wait times before election failures are identified and election processes retried by a node. These time frames can range from milliseconds to seconds in duration.

High availability clusters may include at least three master-eligible nodes, at least two of which are not voting-only nodes. Such a cluster will be able to elect a master node even if one of the nodes fails. Since voting-only nodes may not act as the cluster's elected master, they may require less memory and a less powerful CPU than the true master nodes. However master-eligible nodes, including voting-only nodes, may use reasonably fast persistent storage and a reliable and low-latency network connection to the rest of the cluster, since they are on a critical path for publishing cluster state updates.

Voting-only master-eligible nodes may also fill other roles in the cluster 104. For instance, a node may be both a data node and a voting-only master-eligible node. A dedicated voting-only master-eligible node is a voting-only master-eligible node that fills no other roles in the cluster.

In some embodiments, a node can have all the following roles: master-eligible, data, ingest, and machine learning. For larger clusters, it is better to have specialized nodes, assigning dedicated role types to nodes. As noted above, the master node is responsible for lightweight cluster-wide actions such as creating or deleting an index, tracking which nodes are included in the cluster, and deciding which shards to allocate to which nodes.

Electing a master node and changing the cluster state (e.g., voting configuration) are the two tasks that master-eligible nodes can work together to perform. It is important that these activities work robustly even if some nodes have failed. This robustness is achieved by considering each action to have succeeded based on receipt of responses from a quorum, which is a subset of the master-eligible nodes in the cluster.

The advantage of utilizing only a subset of the nodes in a cluster to respond is that it means some of the nodes can fail without preventing the cluster from making progress. The quorums are carefully chosen so the cluster does not have a "split brain" scenario where it's partitioned into two pieces such that each piece may make decisions that are inconsistent with those of the other piece. The quorums are defined through a voting configuration, which is the set of master-eligible nodes whose responses are counted when making decisions such as electing a new master or committing a new cluster state. Decisions are made only after a majority of the nodes in the voting configuration responds. A quorum is therefore defined to be a majority of the voting configuration.

Consistency is achieved through this process because no matter how a cluster is partitioned no more than one part can contain a majority of the voting configuration. Thus, no part may contain a majority and in that case the cluster cannot continue operating until the partition is healed. Nodes can be identified in the voting configuration using their persistent node ID, a universally unique identifier (UUID) which is unique for each node, generated the very first time the node is started and persisted in its data folder to survive restarts.

Starting an Elasticsearch™ cluster, such as the cluster 104, for the very first time includes establishing an initial voting configuration. This is known as cluster bootstrapping and is utilized the very first time the cluster 104 starts up. Nodes that have already joined a cluster store bootstrapping information in their data folder for use in a full cluster restart, and freshly-started nodes that are joining a running cluster obtain this information from the cluster's elected master. Master node election processes are described in greater detail herein, but in general can be mediated by an elector 117 of the cluster coordination subsystem 114.

Changes to the cluster 104, such as after a node joins or leaves the cluster 104 can trigger a reconfiguration of the voting configuration. In some embodiments, the reconfiguration of the voting configuration can be performed by a reconfigurator 115, which can be invoked by the cluster coordination subsystem 114 based on detected changes to the cluster 104.

Changes to the voting configuration can be automatically propagated to the nodes of the cluster through a publisher 119 of the cluster coordination subsystem 114. In some embodiments, the publisher 119 can cause automatic propagation of corresponding changes to the voting configuration in order to ensure that the cluster 104 is as resilient as possible. This is also called auto-reconfiguration as the cluster automatically reconfigures the set of master-eligible nodes whose responses are counted when making decisions at the cluster level. Larger voting configurations are usually more resilient, so the preference is to add master-eligible nodes to the voting configuration after they join the cluster.

Similarly, if a node in the voting configuration leaves the cluster and there is another master-eligible node in the cluster that is not in the voting configuration then it is preferable to swap these two nodes over. A size of the voting configuration is thus unchanged but its resilience increases.

Cluster Bootstrapping

In various embodiments, the cloud 100 can include a bootstrapping subsystem 108. It will be understood that a bootstrap configuration can identify which nodes should vote in a first election. It is also important to note that the bootstrap configuration can originate from outside the cluster, such as through the user terminal. That is, the user can initially establish the bootstrap configuration for the cluster 104. In some embodiments, the cluster can determine a bootstrap configuration correctly on its own, such as by maintaining and applying a prior bootstrap configuration.

The initial set of master-eligible nodes is defined in a set of initial master nodes settings. This should be set to a list containing one of the following items for each master-eligible node, allowing that node to be uniquely identified: (a) a node name of the node, configured by a user; (b) a node's hostname if the node name is not set, because the node name defaults to the node's hostname (the user can use either a fully-qualified hostname or a bare hostname); and (3) an IP (Internet Protocol) address of the node's publish address, if it is not possible to use the node.name of the node (this is normally the IP address to which network.host resolves but this can be overridden); and (4) an IP address and port of the node's publish address, in the form of IP:PORT, if it is not possible to use the node.name of the node and there are multiple nodes sharing a single IP address.

When a master-eligible node is initiated, the user can provide this setting on the command line or in the human-readable data-serialization language file. In another embodiment, bootstrapping can be triggered by an external system 110. For example, an existing cluster can establish bootstrapping configurations for a new cluster. Bootstrapping configurations can be provided by any external system using an application programming interface (API) providing access to the cloud 100. For example, an external system 110 can couple to the cloud 100 through an API 112 to provide bootstrapping configurations to the cluster 104.

After the cluster has been initiated, this setting is no longer required. It need not be set on master-ineligible nodes, nor on master-eligible nodes that are started to join an existing cluster. As noted above, master-eligible nodes can use storage that persists across restarts. If they do not, and the initial master nodes settings is reset and a full cluster restart occurs, then another brand-new cluster is formed and this may result in data loss.

In some embodiments it is sufficient to set initial master nodes settings on a single master-eligible node in the cluster, and only to mention that single node in the setting's value, but this provides no fault tolerance before the cluster has fully formed. It is therefore preferred to bootstrap using at least three master-eligible nodes, each with initial master nodes settings comprising these three nodes.

The bootstrap process includes resolving a list of names for nodes in the initial master nodes settings to their persistent node IDs after discovery. Discovery is the process by which a node finds other nodes with which to potentially form a cluster. This process can be performed when a node is created or when a node believes the master node has failed and continues until the master node is found or a new master node is elected. The node can identify a set of other nodes, together with their node name, publish address, as well as their persistent node ID.

In cases where not all names in initial master nodes settings can be resolved using the discovered nodes, but at least a majority of the entries have been resolved to their persistent node ID, the remaining names can be added as place holders to the voting configuration, to be resolved later. This allows a cluster with at least three nodes (and initial master nodes settings set to the names of these three nodes) to fully bootstrap as soon as two out of the three nodes have found each other through the discovery process.

When bootstrapping is correctly configured, with each name uniquely identifying a node, then this process is safe, which means that at most one cluster will be formed, even in the presence of network partitions or nodes crashing or restarting. The process is also eventually successful, as long as a majority of nodes that are referenced in the initial master nodes settings are available.

According to some embodiments, the bootstrapping subsystem 108 can execute an auto-bootstrapping in certain circumstances. If the cluster 104 is running with a completely default configuration then it will automatically bootstrap a cluster based on the nodes that could be discovered to be running on the same host within a short time after startup. This means that by default it is possible to start up several nodes on a single machine and have them automatically form a cluster which is very useful for development environments and experimentation.

Automatic Reconfiguration

Node identifier(s) referred to in the voting configuration are not necessarily the same as the set of all available master-eligible nodes in the cluster 104. Altering the voting configuration involves taking a vote, so it takes some time to adjust the configuration as nodes join or leave the cluster 104. Also, there are situations where the most resilient configuration includes unavailable nodes or does not include some available nodes. In these situations, the voting configuration may differ from the set of available master-eligible nodes in the cluster 104.

The best possible voting configuration can be selected based on a number of factors, some of which are configurable. No matter how it is configured, the cluster 104 will not suffer from a "split-brain" inconsistency. Only the availability of the cluster is affected in the case where some of the nodes in the cluster are unavailable.

In some embodiments, there should normally be an odd number of master-eligible nodes in a cluster. If there is an even number, one of the nodes can be excluded from the voting configuration to ensure that it has an odd size. This omission does not decrease the failure-tolerance of the cluster 104. In fact, it improves it slightly. For example, if the cluster 104 suffers from a network partition that divides it into two equally-sized halves then one of the halves will contain a majority of the voting configuration and will be able to keep operating. If all of the votes from master-eligible nodes were counted, neither side would contain a strict majority of the nodes and the cluster would not be able to make any progress.

For instance, if there are four master-eligible nodes in a cluster and the voting configuration contained all of them, any quorum-based decision would require votes from at least three of them. This situation means that the cluster can tolerate the loss of only a single master-eligible node. If this cluster were split into two equal halves, neither half would contain three master-eligible nodes and the cluster would not be able to make any progress. If the voting configuration contains only three of the four master-eligible nodes, however, the cluster is still only fully tolerant to the loss of one node, but quorum-based decisions require votes from two of the three voting nodes. In the event of an even split, one half will contain two of the three voting nodes so that half will remain available In general, larger voting configurations are usually more resilient, so there is a preference to add master-eligible nodes to the voting configuration after such nodes join the cluster. Similarly, if a node in the voting configuration leaves the cluster and there is another master-eligible node in the cluster that is not in the voting configuration then it is preferable to swap these two nodes over. The size of the voting configuration is thus unchanged but its resilience increases.

There are several options for automatically removing nodes from the voting configuration after they have left the cluster. Different strategies have different benefits and drawbacks, so the right choice depends on how the cluster will be used. A user can control whether the voting configuration automatically shrinks by using the cluster shrinking setting. If cluster shrinking is enabled and there are at least three master-eligible nodes in the cluster, the cluster 104 remains capable of processing cluster state updates as long as all but one of its master-eligible nodes are healthy. There are situations in which the cluster 104 might tolerate the loss of multiple nodes, but this is not guaranteed under all sequences of failures. If the cluster shrinking setting is false, the user can remove departed nodes from the voting configuration manually.

In order to avoid unnecessary reconfiguration steps, the cluster prefers to keep existing nodes in the voting configuration. These rules provide a very intuitive behavior for running clusters. If a user desires to add some nodes to a cluster, the user can configure the new nodes to find the existing cluster and start them up. New nodes can be added to the voting configuration if it is appropriate to do so. When removing master-eligible nodes, it is important not to remove half or more of the master-eligible nodes all at the same time. For instance, if there are currently seven master-eligible nodes and the user desires to reduce this to three it is not possible simply to stop four of the nodes at once. To do so would leave only three nodes remaining, which is less than half of the voting configuration, which means the cluster cannot take any further actions. By only shutting down three nodes at once, the cluster 104 can auto-reconfigure, subsequently allowing the shutdown of further nodes without affecting the cluster's availability.

As noted above, the cluster 104 can implement an API to manually influence a voting configuration. In some instances, the user can define a list of nodes to exclude from the voting configuration. If the user desires to shrink the voting configuration to contain fewer than three nodes or to remove half or more of the master-eligible nodes in the cluster at once, the user can use the API to remove departed nodes from the voting configuration manually. The API adds an entry for that node in the voting configuration exclusions list. The cluster then tries to reconfigure the voting configuration to remove that node and to prevent it from returning.

The API waits for the system to auto-reconfigure the node out of the voting configuration up to the default timeout of 30 seconds. If the API fails, it can be safely retried. Only a successful response guarantees that the node has been removed from the voting configuration and will not be reinstated.

According to some embodiments, the cluster 104 can be reconfigured to increase the level of fault tolerance of the cluster. A cluster coordination subsystem 114 is used to allow nodes in the cluster to share a strongly consistent view of metadata. In general, metadata contains information about which nodes are part of the cluster, what indices exist, what their mappings (schemata) are, which shards are allocated to which nodes (i.e., where the different partitions of the data reside), and which shard copies are considered in-sync (contain the most recent writes). Inconsistencies at the metadata layer can lead to data loss at the data layer. The metadata is captured in an object which is called the cluster state. This object is shared by and available on all nodes in the cluster, and the object over which the master-eligible nodes coordinate. The voting configuration is contained in this cluster state object.

The master node is the only node in a cluster that can make changes to the cluster state. The master node processes one batch of cluster state updates at a time, computing the required changes and publishing the updated cluster state to all the other nodes in the cluster. A publication starts with the master node broadcasting the updated cluster state to all nodes in the cluster. Each other node in the cluster responds with an acknowledgement but does not yet apply the newly-received state. Once the master node has collected acknowledgements from a quorum of nodes in the voting configuration, the new cluster state is said to be committed and the master node broadcasts another message instructing the other nodes to apply the now-committed state. Each node receives this message, applies the updated state, and then sends a second acknowledgement back to the master node.

To allow reconfiguration, the cluster state can comprise two voting configurations, the one that's currently active, called the last committed configuration, and a future target configuration, called the last accepted configuration. In a stable state, both configurations can be equal.

Decisions during a reconfiguration can involve a majority of votes in the current configuration as well as the target configuration. This ensures that a majority of nodes in the last committed configuration become aware that future decisions must include a majority of nodes in the new last accepted configuration as well as that a majority of nodes in the new last accepted configuration are aware of the last committed configuration, making them aware that they cannot proceed with making decisions purely based on the new configuration until these nodes have heard from a majority in the old configuration that they have learned about the new configuration (i.e., that the last accepted configuration becomes committed). Regardless of the reconfiguration, one parameter of a suitable reconfiguration is the maintenance of an optimal level of fault tolerance in the cluster.

An ongoing reconfiguration process needs to complete before another one can be started. Changes to the cluster state are then committed once they have been accepted by a majority of nodes in the last committed configuration, as well as a majority of nodes in the last accepted configuration. Master elections also now require a majority of votes from nodes in the last committed configuration as well as a majority of votes from nodes in the last accepted configuration.

As noted above, the reconfiguration process is fully safe, ensuring that even in the presence of network partitions and nodes crashing or restarting, the cluster never ends up in a split-brain situation where it would have two masters making inconsistent decisions, ultimately leading to data loss. Also, as long as a majority of nodes in the last committed configuration as well as a majority of nodes in the last accepted configuration available, the cluster can make progress and complete a reconfiguration and continue to make changes to the cluster state.

In some embodiments, a user can perform unsafe operations on a node. In order to perform unsafe operations the node should be in a shut-down state. Unsafe operations can include adjusting the role of a node and/or recovering some data after a disaster or start a node even if it is incompatible with the data on disk.

Figure 2A:
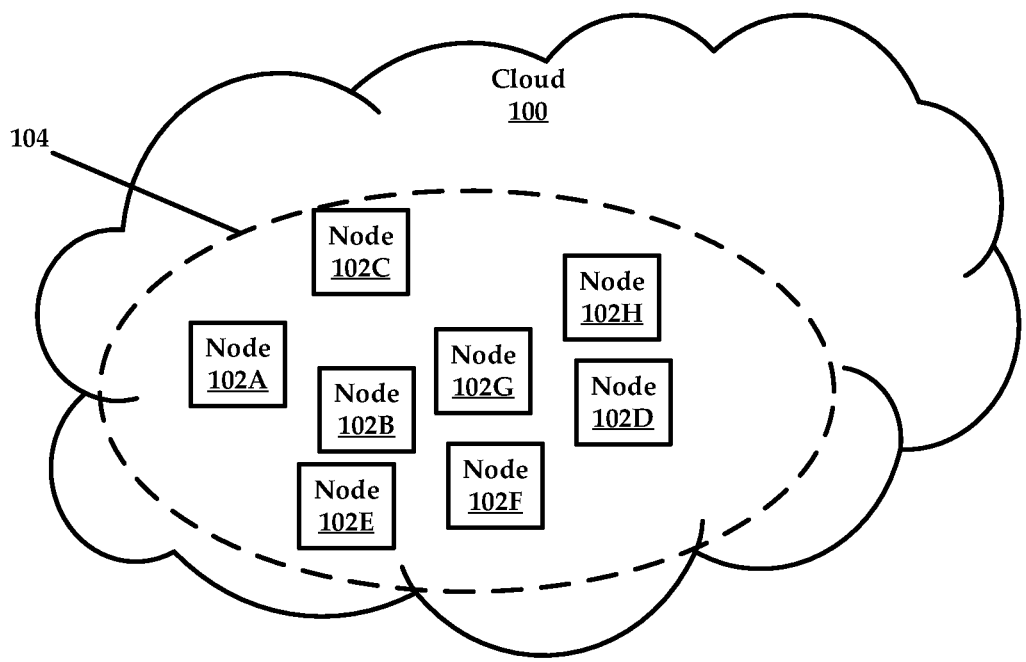
FIGS. 2A and 2B collectively illustrate an example cluster reconfiguration process.
Figure 2B:
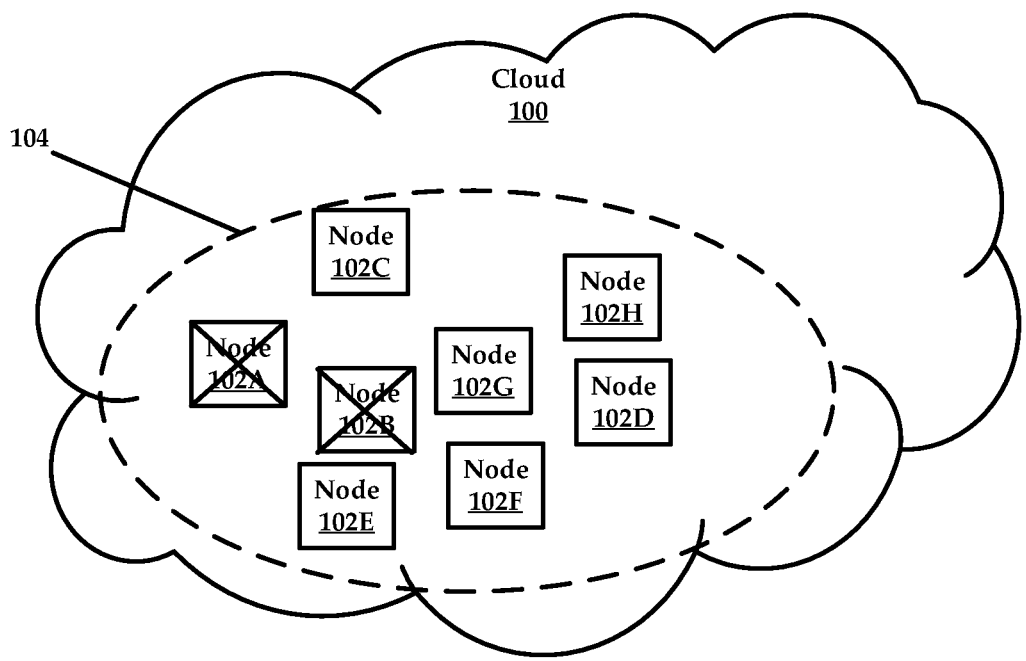

FIG. 2A illustrates an example cluster reconfiguration. As noted above, the cluster 104 originally includes nodes 102A-102E. A user desires to add three new nodes 102F-102H, which can be added to the cluster when the user configures the nodes with a cluster identifier that matches the identifier of nodes 102A-102E that are already in the cluster. When new nodes are added to the cluster, the new nodes can discover the other nodes of the cluster using the unique cluster identifier (and vice-versa). FIG. 2B illustrates that original nodes 102A and 102B are now unavailable and can be removed from the cluster 104. New nodes 102F and 102G are added preferentially as they are master-eligible nodes. Nodes 102F and 102G are brought into the voting configuration when they are added (before node 102A and node 102B became unavailable) but node 102H is not included since including node 102H would create an even number of master-eligible nodes. Then when node 102A and/or node 102B fails node 102H would be added.

As the new nodes are added and original nodes are removed, a master node, such as node 102C can trigger an automatic voting process, where the master-eligible nodes 102A, 102B, 102C, 102F and 102G are polled until a quorum is determined, as described above. The original master node 102C can retain its position as the master node or a different node of the master-eligible nodes could alternatively be selected. Again, the process for electing a master node can be performed as described above, which can include randomized scheduling of nodes for election process. In various instances, the first node allowed to vote is likely to become the master node.

Figures 3, 4:
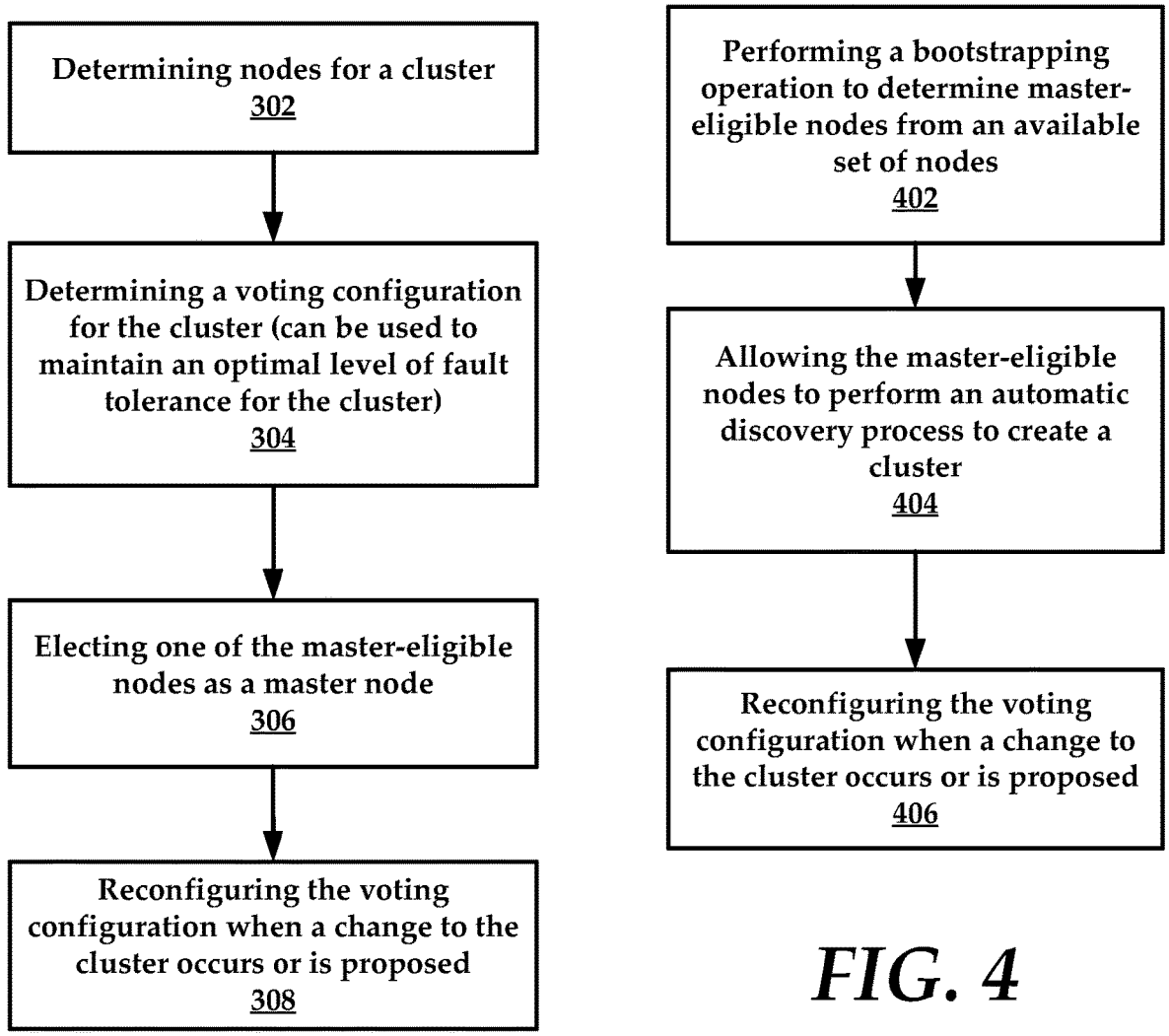
FIG. 3 is a flowchart of an example method of the present disclosure related to cluster coordination.
FIG. 4 is a flowchart of another example method of the present disclosure related to cluster coordination.

FIG. 3 is a flowchart of an example method. The method includes a step 302 of determining nodes of a cluster. As noted above, during a bootstrapping process, a user can identify nodes of a cluster. In various instances, each of the nodes has a unique identifier and a cluster identifier for the cluster. The cluster identifier may not be provided to the node initially until the bootstrapping process is finished and a master node has been elected. In other embodiments a node in a cluster can be provisioned with a cluster identifier, such as when a cluster has already been created for a user and the user desires to add a new node to the cluster.

The method can also include a step 304 of determining a voting configuration for the cluster. In general, the voting configuration defines a quorum of master-eligible nodes of the nodes. The voting configuration is adaptable so as to maintain an optimal level of fault tolerance for the cluster. For example, the optimal level could include five master-eligible nodes of a cluster. The cluster could be fault tolerant down to three master-eligible nodes. The cluster with five nodes is more resilient, as it can maintain availability even if one or two nodes are lost. As noted above, a split-brain scenario is avoided by making sure that a minimum number of master-eligible nodes is present in order for any part of the cluster to elect a master node and accept user requests. To prevent multiple parts of a cluster from being eligible, there can be a quorum-based majority of $\lfloor n/2 \rfloor+1$ nodes, and further n is the number of nodes in the voting configuration, and n is preferable not an odd number. The minimum number of master nodes to reach quorum in a two-node cluster is the same as for a three-node cluster: two nodes must be available. This process is referred to as establishing a fault tolerance level for the cluster. To be sure, the fault tolerance level is determined as a number of nodes in the cluster compared to a number of nodes that can be lost from the cluster while still maintaining availability. The cluster is determined to be in an unavailable state when the number of nodes in the cluster falls below an available node threshold.

The method can also include a step 306 of electing one of the master-eligible nodes as a master node. The master node can coordinate actions of nodes in the cluster, even when the nodes are not in communication with one another. As noted above, the election of the master node can be randomly scheduled to prevent two master-eligible nodes from initiating simultaneous elections.

As noted above, the voting configuration is initially established using cluster bootstrapping where the cluster identifier is stored by the nodes and an initial set of the nodes are selected to vote. Once initiated, the nodes in the cluster are configured to discover one another. The cluster is created when a threshold number of the master eligible nodes have been discovered, even when a portion of the nodes have not been fully resolved. The names of the portion of the nodes are added to the voting configuration and resolved with details such as IP address at a later time.

The method can further include a step 308 of reconfiguring the voting configuration when a change to the cluster occurs. The change can include the loss of a node, or the addition of a node. To be sure, reconfiguring can include selecting a best possible voting configuration, which may exclude a portion of the nodes, including a portion of the master eligible nodes. For example, if there is an even number of master eligible nodes, a portion of these nodes can be ignored so as to create an odd number of master eligible nodes.

FIG. 4 is a flowchart of another example method. The method includes executing a bootstrap configuration of a cluster by a step 402 of determining master-eligible nodes from an available set of nodes. Next, the method includes a step 404 of allowing the master-eligible nodes to perform an automatic discovery process to create a cluster. Each of the master-eligible nodes can include a unique node identifier and a cluster identifier.

The method can include establishing an optimal level of fault tolerance for the cluster using a voting configuration. Again the voting configuration determines how many master eligible nodes are required for a quorum used to elect a master node. In various embodiments, the method includes a step 406 of reconfiguring the voting configuration based on a change to the cluster.

The method can include resolving a majority of the master-eligible nodes, as well as determining a voting configuration for the cluster. To be sure, the voting configuration defines a quorum of the master-eligible nodes. The method can also include a step of electing a master node from the master-eligible nodes based on the voting configuration.

Figure 5:
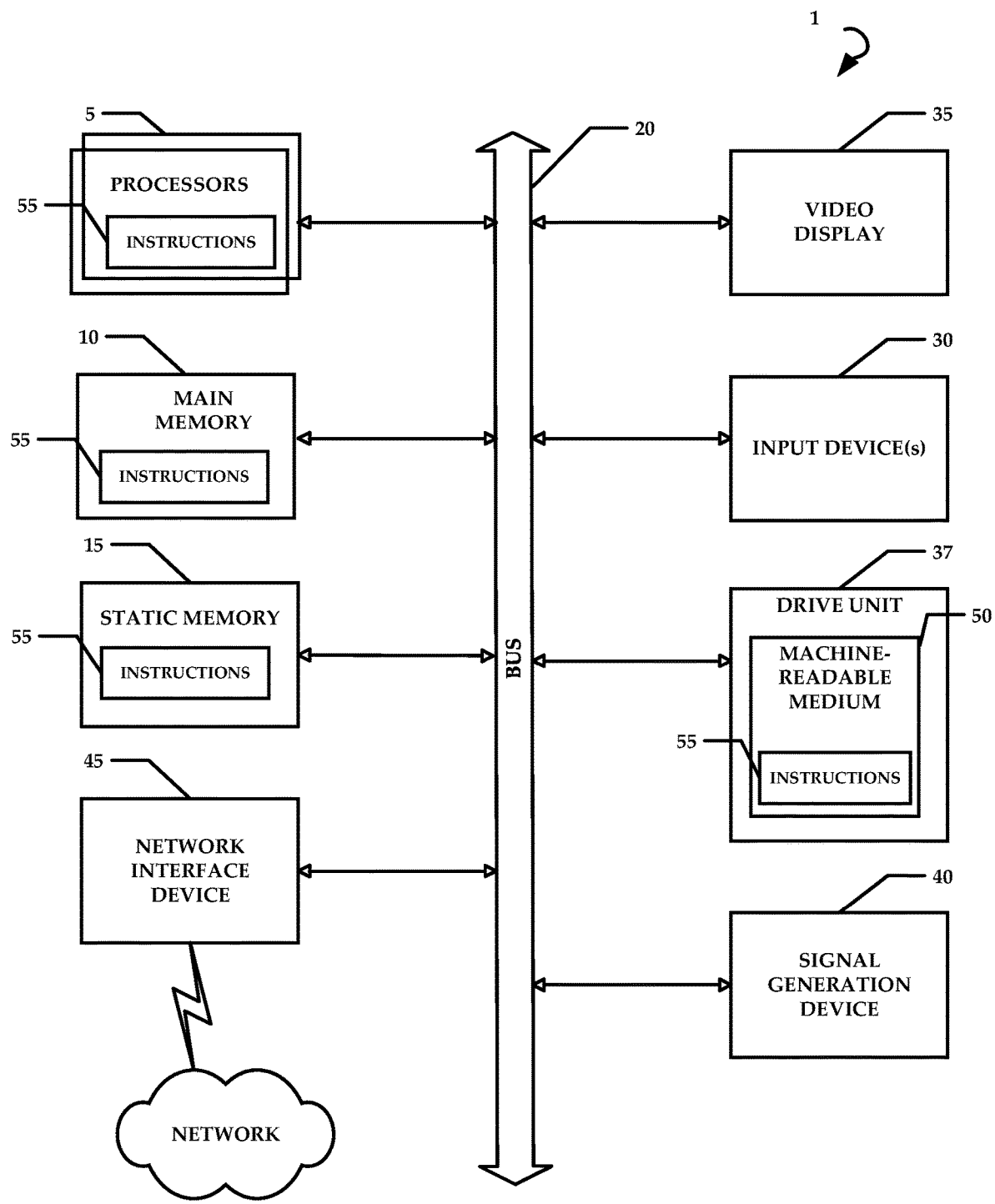
FIG. 5 is a schematic diagram of an example computer system that can be used to practice aspects of the present disclosure.

FIG. 5 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method to be performed by one or more computer processors in one or more nodes in a cluster, the method comprising:
    determining a voting configuration for the cluster based on a cluster state and a voting configuration exclusions list, the exclusions list preventing a listed node from returning to the voting configuration, the voting configuration defining a quorum of master-eligible nodes of the nodes, the voting configuration being adaptable so as to maintain an optimal level of fault tolerance for the cluster, wherein reconfiguration is controlled through an Application Programming Interface;
    establishing a fault tolerance level for the cluster, the fault tolerance level being determined as a number of nodes in the cluster compared to a number of nodes that can be lost from the cluster while the cluster maintains availability; and
    electing one of the master-eligible nodes as a master node.

2. The method according to claim 1, wherein reconfiguring the voting configuration comprises electing a new master node.

3. The method according to claim 1 further comprising determining the cluster to be in an unavailable state when a number of nodes in the cluster falls below an available-node threshold.

4. The method according to claim 1, wherein the cluster is divided into two or more portions that are not in communication with one another or communication within the cluster is disrupted, wherein the master node coordinates actions of the two or more portions.

5. The method according to claim 1, wherein the step of electing is randomly scheduled to prevent two master-eligible nodes from initiating simultaneous elections.

6. The method according to claim 1 wherein one or more of the master-eligible nodes is a voting-only master-eligible node.

7. The method according to claim 1, wherein the voting configuration is initially established using cluster bootstrapping where a cluster identifier is stored by the nodes and an initial set of the nodes are selected to vote.

8. The method according to claim 1, wherein the nodes in the cluster are configured to discover one another.

9. The method according to claim 1, wherein the cluster is created when a threshold number of master-eligible nodes have been discovered, even when a portion of the nodes have not been fully resolved, wherein names of the portion of the nodes are added to the voting configuration.

10. The method according to claim 1, further comprising reconfiguring the voting configuration when a change to the cluster occurs.

11. The method according to claim 10, wherein reconfiguring includes selecting a best possible voting configuration which may exclude a portion of the nodes including a portion of the master-eligible nodes.

12. A method to be performed by one or more computer processors in one or more nodes in a cluster, the method comprising:
    bootstrapping the cluster by:
        determining at least three master-eligible nodes;
        resolving a list of names to persistent node IDs after discovery for the at least three master-eligible nodes;
        allowing the master-eligible nodes to perform an automatic discovery process to create the cluster based on a cluster state and a voting configuration exclusions list, the exclusions list preventing a listed node from returning to a voting configuration; and
        establishing an optimal level of fault tolerance for the cluster using the voting configuration, the fault tolerance level being determined as a number of nodes in the cluster compared to a number of nodes that can be lost from the cluster while the cluster maintains availability; and
    reconfiguring the voting configuration based on a change to the cluster, the reconfiguring comprising updating the cluster state based on acceptance by a quorum in a current voting configuration and a quorum in a target voting configuration;

wherein the bootstrapping is invoked through an Application Programming Interface.

13. The method according to claim 12, further comprising:
   determining the voting configuration for the cluster, the voting configuration defining a quorum of the master-eligible nodes; and
   electing a master node from the master-eligible nodes based on the voting configuration.

14. The method according to claim 12 wherein the cluster includes nodes that are not master-eligible nodes, further wherein the master node is configured to manage a cluster index tracking which of the nodes are included in the cluster and deciding which shards to allocate to which of the nodes.

15. The method according to claim 12, wherein there are an odd number of master-eligible nodes in the cluster.

16. The method according to claim 12, further comprising determining the cluster to be in an unavailable state when a number of nodes in the cluster falls below an available-node threshold.

17. A method of reconfiguring a cluster, the method to be performed by one or more computer processors in one or more nodes in the cluster, the method comprising:
   selecting one or more nodes to be removed;
   determining a count of master-eligible nodes in the cluster;
   determining a number of master-eligible nodes within the one or more nodes to be removed;
   removing the selected one or more nodes if the number of master-eligible nodes to be removed is less than half the count of master-eligible nodes in the cluster;
   removing less than half of the count of master-eligible nodes in the selected one or more nodes if the number of master-eligible nodes to be removed is equal to or greater than half the count of master-eligible nodes in the cluster and auto-configuring the cluster; and
   removing any remaining master-eligible nodes selected to be removed that have not been removed;
   wherein nodes are added to or removed from the cluster using an Application Programming Interface.

* * * * *